Figure 1:
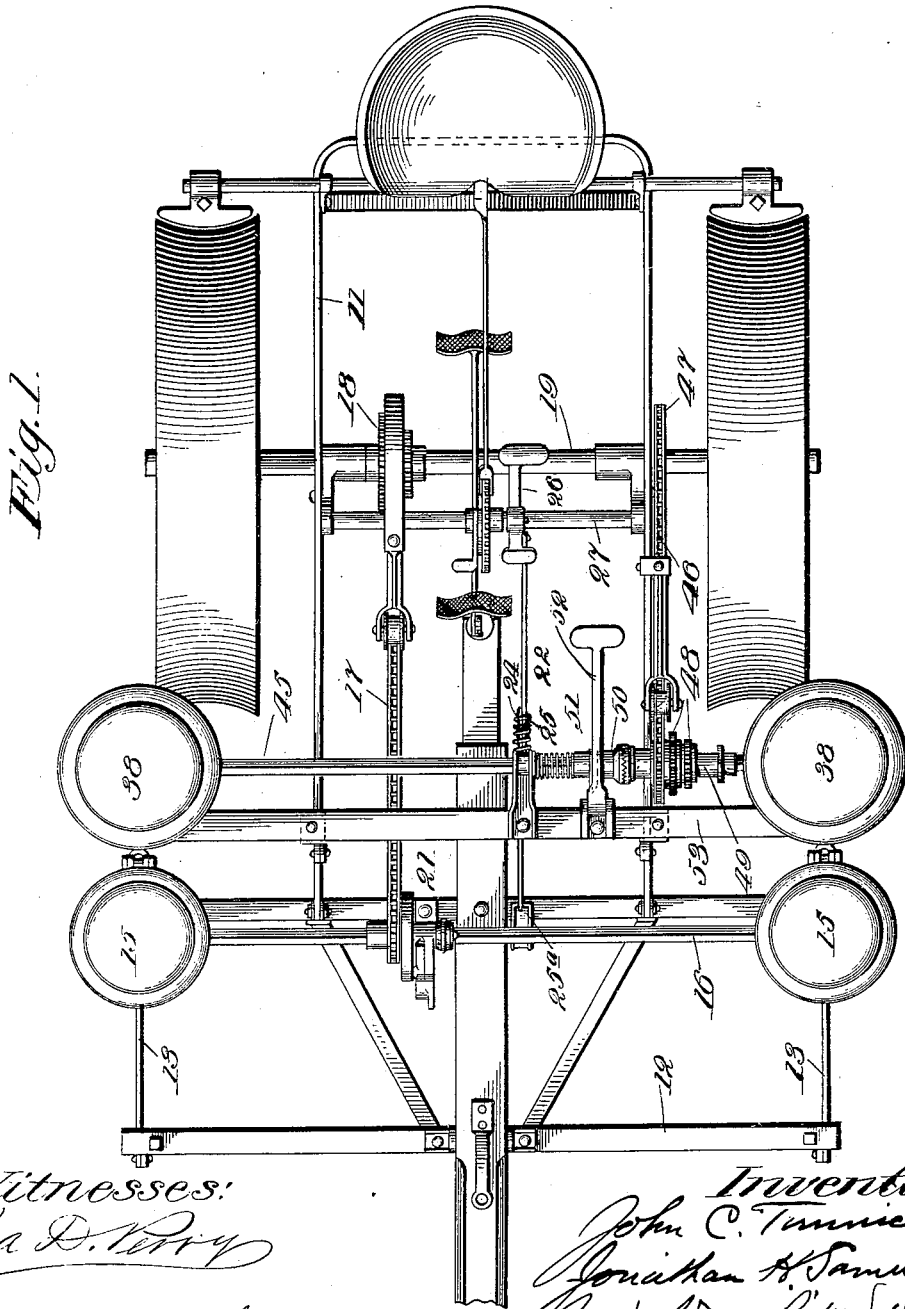

No. 674,621. Patented May 21, 1901.
J. C. TUNNICLIFF & J. H. SAMUELS.
COMBINED CORN PLANTER AND FERTILIZER DISTRIBUTER.
(Application filed Sept. 27, 1900.)
(No Model.) 3 Sheets—Sheet I.

No. 674,621. Patented May 21, 1901.
J. C. TUNNICLIFF & J. H. SAMUELS.
COMBINED CORN PLANTER AND FERTILIZER DISTRIBUTER.
(Application filed Sept. 27, 1900.)
(No Model.) 3 Sheets—Sheet 2.
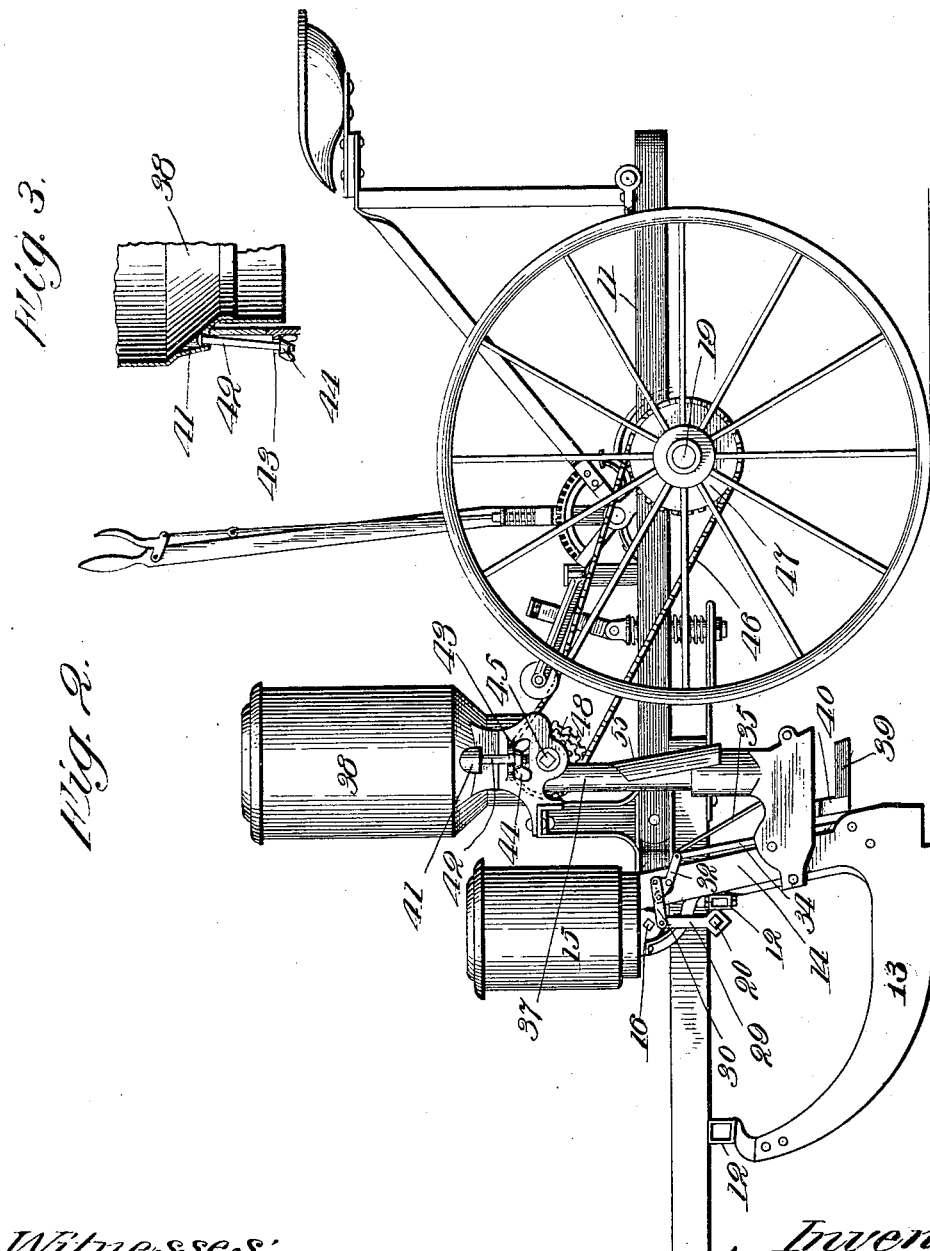
Witnesses:
Ira D. Perry
J. W. Paulenschmidt.
Inventors
John C. Tunnicliff
Jonathan H. Samuels
by Bond Adams Pickard Jackson
Attys.

No. 674,621. Patented May 21, 1901.
J. C. TUNNICLIFF & J. H. SAMUELS.
COMBINED CORN PLANTER AND FERTILIZER DISTRIBUTER.
(Application filed Sept. 27, 1900.)
(No Model.) 3 Sheets—Sheet 3.
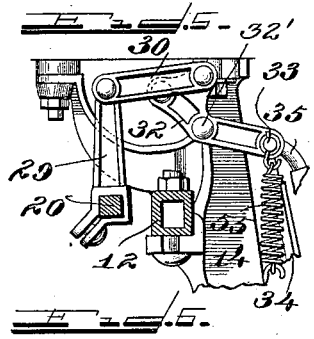
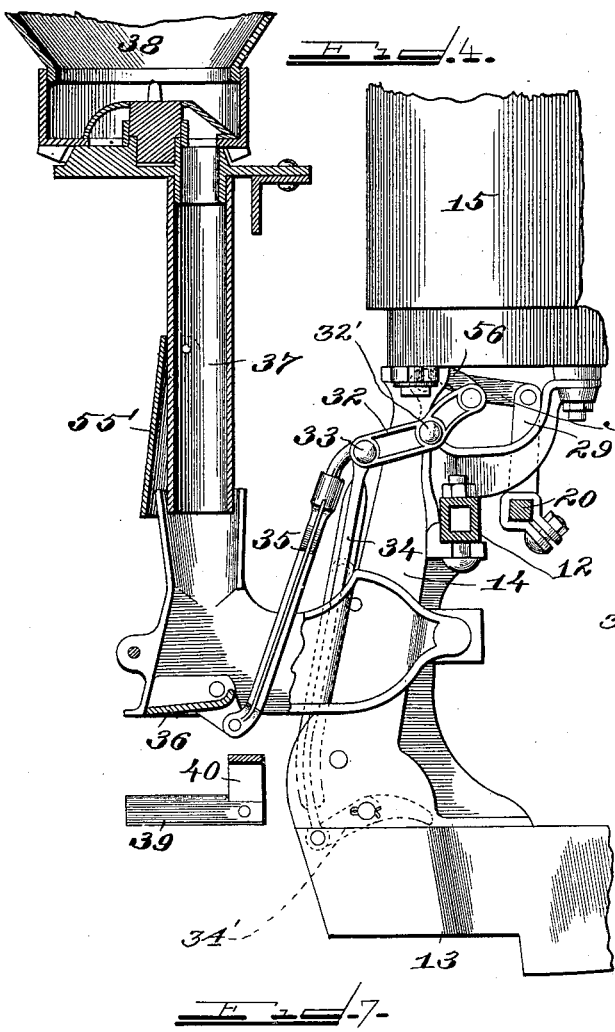
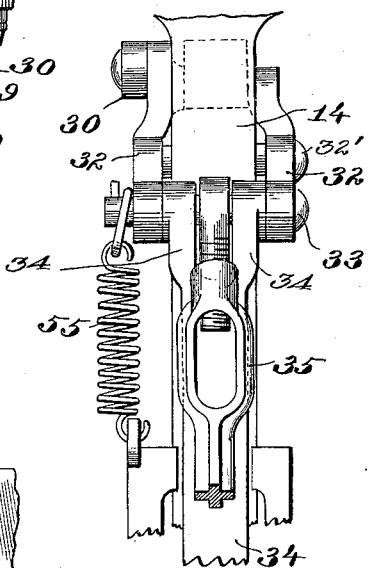
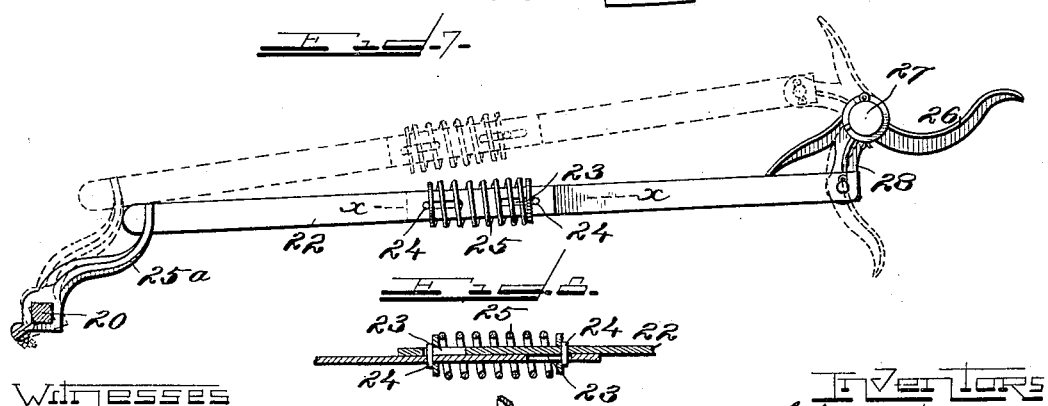

UNITED STATES PATENT OFFICE.

JOHN C. TUNNICLIFF AND JONATHAN H. SAMUELS, OF MOLINE, ILLINOIS, ASSIGNORS TO D. M. SECHLER CARRIAGE COMPANY, OF SAME PLACE.

COMBINED CORN-PLANTER AND FERTILIZER-DISTRIBUTER.

SPECIFICATION forming part of Letters Patent No. 674,621, dated May 21, 1901.

Application filed September 27, 1900. Serial No. 31,297. (No model.)

*To all whom it may concern:*

Be it known that we, JOHN C. TUNNICLIFF and JONATHAN H. SAMUELS, citizens of the United States, residing at Moline, in the county of Rock Island and State of Illinois, have invented certain new and useful Improvements in a Combined Corn-Planter and Fertilizer-Distributer, of which the following is a specification, reference being had to the accompanying drawings.

Our invention relates to improvements in corn-planters of the well-known type or kind capable of being converted at any time from a check-row planter to a drill-planter; and it has for its objects to provide an improved operating-bar through which the rock-shaft that controls the valves in the runners can be turned and locked, so as to hold such lower valves out of operative position, thus permitting the machine to be changed from a check-row planter to a drill-planter; to provide improved means for holding such bar locked in position when it is in use for holding the rock-shaft for drill-planting; to provide improved devices for operating the lower valve of a fertilizing-receptacle simultaneously with the operation of the seed-valves in the runners, so that a fertilizing material may be dropped with the corn; to provide improved means for spreading or dividing the fertilizing material as it issues from the tube that carries it from the fertilizer-receptacle, thereby insuring the fertilizer material being dropped at the sides of the planted corn instead of directly upon it; to provide a shield or protector for the joint in the telescopic tube employed to conduct the fertilizing material from the receptacle, which will prevent to a large extent the admission into the tube of any dirt thrown against the tube by the carrying-wheel immediately in the rear, but which will not interfere with the free telescopic movement of the sectional tube; to provide an improved fastening for the fertilizer-receptacle, enabling such receptacle to be readily detached from the machine or attached to it; to provide improved means within the control of the operator while on his seat for throwing into or out of use a clutch on the shaft through which the valves on the bottom of the fertilizer-receptacles are operated, so that fertilizing material may be dropped with the corn or such dropping prevented; to provide means for regulating the quantity of fertilizing material to be dropped by changing the speed of rotation of the valves in the receptacles, and to improve generally the construction and operation of machines of the type specified. We attain these objects by the devices and combinations of devices illustrated in the drawings and hereinafter fully described.

That which we regard as new will be pointed out in the claims.

In the accompanying drawings, Figure 1 is a plan view. Fig. 2 is a side elevation. Fig. 3 is a detail illustrating the locking means for securing the fertilizer-receptacle in place. Fig. 4 is a detail, being a view, partly in section, of the devices for simultaneously operating the discharge-valves in the tubes through which the seed and fertilizing material are discharged, the fertilizer-receptacle being shown in section. Fig. 5 is a similar view taken from the opposite side of the machine from that at which Fig. 4 is taken and with the seedbox and fertilizer-receptacle and their respective tubes omitted. Fig. 6 is a rear view, enlarged, of the parts shown in Fig. 5. Fig. 7 is a side elevation of the bar employed when it is desired to convert the machine from a check-row planter to a drill-planter, showing also in dotted lines the position assumed by the parts when such rod is operated to so convert the machine to a drill-planter. Fig. 8 is a section at line *x x* of Fig. 7, and Fig. 9 is a perspective view of the fertilizer spreader or divider and its attaching-arm.

Referring to the drawings, 11 indicates the main or wheel frame of the planter, and 12 the runner-frame, flexibly secured together, as usual, and both of ordinary construction.

13 indicates the runners or furrow-openers, having the usual seed-tubes 14 in the rear and communicating with ordinary seedboxes 15, mounted on the runner-frame. Checkrower heads are to be provided, as usual, but are not shown in the drawings. The ordinary rotating seed-plates in the boxes 15 are operated by the rotation of shaft 16, which is driven by a chain 17, passing over a sprocket-wheel on said shaft and over another sprocket-wheel keyed to the axle 19 of the machine. This construction is old and well known and need not therefore be more specifically described.

20 indicates the usual rock-shaft, located beneath the shaft 16 and to which the actuating-levers on the check-rower heads are to be connected, as usual, so as to rock said shaft 20 for the purpose of operating the dropping-valves in the runners.

The shaft 16 is provided with a clutch 21, substantially similar to that shown and described in Letters Patent No. 593,295 to C. H. Dooley, dated November 9, 1897, by means of which the shaft is intermittently operated when the check-rower devices are employed, but which can be readily adjusted to permit continuous rotation of said shaft 16 when it is desired to convert the machine into a drill-planter. In the Dooley patent referred to the shifting of the clutch to effect this change in the operation of the shaft has been made through the medium of a rigid bar removably connected at its forward end to a short lever on the shaft which carries the clutch, and after the change was made it was necessary to lock the bar by means of a pivoted latch. It has been found that some difficulty has been experienced at times in adjusting a rigid bar in place, due to slight differences in size of parts or to wear. By our improvements we provide a bar that can be made to fit into place instantly, regardless of slight changes of size in parts or slight differences in distance between the two points of attachment of the bar. By the construction shown no separate locking latch or dog is required. Our improved connecting-bar (indicated by 22) is made in two parts or sections, the inner ends of which lap and are connected together by bolts or keys 24, each passing through a suitable hole in one section and a slot 23 in the other section. Between the two bolts or keys is a coiled spring 25, tending to force the two sections of the bar outward. This construction permits the bar as a whole to be shortened to the extent of the length of the slots 23, and hence permits the bar as a whole to be readily made to fit between its two points of attachment. This sectional bar 22 has a notch in its edge near the forward end to adapt it to be removably engaged, as was the case with the rigid bar, with the short lever 25ª, attached to the rock-shaft 20.

26 indicates a foot-lever, which rocks upon a shaft 27, extending across and secured to the frame of the machine. It has a short lug 28 formed with it, to which the inner end of the bar 22 is pivoted, and when such foot-lever is turned to force the bar 22 forward to rock the shaft for the purpose specified the pivotal point of attachment of said bar 22 with the foot-lever is carried past the center of the bar 27, on which the foot-lever turns, and hence forms an effectual lock, as will be well understood.

Referring now to the means employed for effecting simultaneous dropping of seed and fertilizer, 29 indicates an arm securely fastened to the rock-shaft 20 and to the upper end of which is pivoted one end of a link 30, the other end of said link 30 being pivotally connected to one of a pair of bell-crank levers 32, that are pivoted to a common bolt 32', passing through them and the seed-tube 14, and which have located between their forward ends the usual valve 56, that closes the upper end of the tube 14. The rear ends of this pair of bell-crank levers 32 where they project beyond the tube 14 are connected by a bolt 33.

34 indicates a rod pivoted to the bolt 33 and extending down in rear of the tube 14 and adapted to be connected at its lower end to the usual lower valve 34' in the tube 14, substantially as indicated by dotted lines in Fig. 4. As shown, the upper end of the rod 34 is forked (see Fig. 6) and the bolt 33 passes through an opening in each fork.

35 indicates a rod pivoted at its upper end on the bolt 33, between the forked upper end of the rod 34, the lower end of said rod 35 being secured to the lower valve 36, that is pivoted at the lower end of the lower section of the telescopic tube 37, which leads from the fertilizer-receptacle 38. As shown, the rod 35 is made in two parts adapted to be screwed together, so that the length of the rod may be adjusted exactly as required. It has of course been common to simultaneously operate the valves that control the escape of seed and fertilizer; but by our construction we provide a simpler and stronger connection than has heretofore been used. Heretofore the pivot-bolt 33 has been extended beyond the side of the tube 14 and the upper end of the rod that actuated the fertilizer-valve was connected to such extended end and its lower end connected with the valve through a crank. In our construction this rod is enabled to be connected centrally to the pivot-bolt 33 on account of the forked construction of the rod 34 and is also attached at its lower end directly to the valve at its central rear portion, thus enabling a direct pull to be had on the valve. A coiled spring 55 is employed to hold the valves and rods in their normal position, as shown in Figs. 5 and 6.

It is desirable in most instances that the fertilizer should not be delivered directly upon the planted corn, but rather that it should be dropped at each side thereof, but in close proximity to the corn. For accomplishing this purpose we provide a device consisting, preferably, of a single piece of sheet metal bent substantially as shown, so as to present two sloping sides. This device (indicated by 39) is to be secured directly beneath the discharge end of the tube, with its central ridge substantially under the central part of the said tube. This fertilizer-spreader is secured in place by a suitable hanger 40, fixed to the side of the tube 37.

While in its most efficient form our invention provides for the delivery of the fertilizer at both sides of the row of corn, we wish it understood that, generically considered, our invention is not restricted to such apparatus, as it contemplates also the embodiment in a machine of any delivering device arranged to deliver the fertilizer at the side (whether one or both sides) of the corn, as distinguished from devices which discharge it so that it falls upon or above or otherwise in contact with the corn. The form shown, however, illustrates our invention in its best form.

In a machine of the kind shown in which a fertilizer-receptacle is employed it is necessary that the discharge-tube of the fertilizer be telescopic in order to allow independent movement of the runner-frame, inasmuch as the fertilizer-receptacle and a portion of its discharge-tube are supported by the main frame, while the lower portion of such tube is carried by the runner-frame. These telescopic tubes being immediately in front of the carrying-wheels of the machine necessarily catch considerable mud and other dirt that is thrown from the wheels, and unless the joint in the telescopic tube be protected much of such dirt is liable to enter through the joint and foul and clog the tube and its lower valve. To prevent this, we have provided a shield 55', constructed of a piece of sheet metal and suitably curved to conform to the shape of the tube. It is attached in any suitable manner to the upper section of the telescopic tube and extends down sufficiently far to cover and protect the joint at the rear portion of the tube. Its lower end is unattached, and, as shown, said lower end is sufficiently flaring to permit the lower portion of the telescopic tube to freely rise and fall with the movement of the runner-frame to which said lower section is attached.

It is desirable that the fertilizer-receptacle be firmly secured in place and yet be capable of ready removal when desired. To this end we have provided improved means for accomplishing this.

41 indicates a socket formed in the side of the receptacle 38, near the lower end thereof, communicating with the interior of such receptacle. 42 indicates a bolt which can be passed into said socket from the interior of the receptacle, the stem of such bolt passing through a suitable hole in the bottom of the socket, but the head being retained therein, as shown. The hole in the bottom of the socket while not large enough to allow the head to pass through is enough larger than the stem to allow such stem to be swung out laterally.

43 indicates a laterally-extending lug on the outside plate of the support on which the fertilizer-receptacle rests, in which lug is a notch, as shown, in which the stem of the bolt 42 rests.

44 indicates a thumb-nut which can be screwed up tightly against the lug 43, thus locking the bolt tightly in place and holding the receptacle 38 firmly seated. Two of these locking devices will ordinarily be employed, located on opposite sides of the receptacle. When it is desired to remove the receptacle for any reason, the thumb-nut is to be screwed down on its stem sufficiently to permit such stem to be swung laterally clear of the notch in the lug in which it rests, and the receptacle is then free to be lifted off. This locking device is cheap, simple, and secure, and as the thumb-nut is not removed from the bolt when the receptacle is removed from the machine there is little liability of either the bolt or its nut being missing when the receptacle is to be replaced on the machine.

For feeding the fertilizing material to the tube 37 ordinary rotating valves or plates are employed in the bottoms of the fertilizer-receptacles, and these are driven through a shaft by means of a chain 46, which passes over a sprocket-wheel 47 on the axle 19 and over one of several sprocket-wheels 48, mounted on a loose sleeve 49, adapted at its inner end to be engaged by a spring-actuated clutch 50, keyed or otherwise firmly affixed to the shaft 45. In order that the driver may readily disengage this clutch in order to prevent operation of the fertilizer-dropping devices, we have provided on the clutch a wheel 51, beveled on that side which is next to the engaging end of the clutch, and above such beveled wheel is a foot-lever 52, pivoted to the front cross-bar 53 of the main frame. Upon bearing down upon this foot-lever it bears against the beveled side of the wheel, forcing back the clutch and disengaging it from the sleeve 49, and thus of course stopping the rotation of the shaft 45. No means are shown for holding the foot-lever 52 out of engagement with the wheel 51; but a spring or other suitable device can be employed for that purpose.

In order that the fertilizing material may be dropped faster or slower from the receptacles to suit different requirements, the sleeve 49 is provided with sprocket-wheels of different diameters, over any one of which the chain 46 can be placed.

That which we claim as our invention, and desire to secure by Letters Patent, is—

1. In a corn-planter, the combination with a machine-frame having carrying-wheels, of seeding mechanism, a rock-shaft, means actuated by the rocking of said shaft for controlling the operation of said seeding mechanism, a lever carried by said rock-shaft, a bar formed of a plurality of sections slidingly connected together and adapted to be connected with said lever, and means for moving said bar to turn said rock-shaft, substantially as and for the purpose specified.

2. In a corn-planter, the combination with a machine-frame having carrying-wheels, of seeding mechanism, a rock-shaft, means actuated by the rocking of said shaft for controlling the operation of said seeding mechanism, a lever carried by said rock-shaft, a bar formed of a plurality of sections slidingly connected together and adapted to be connected with said lever, a spring on said bar for forcing said sections outward, and means for moving said bar to turn said rock-shaft, substantially as and for the purpose specified.

3. In a corn-planter, the combination with a machine-frame having carrying-wheels, of seeding mechanism, a rock-shaft, means actuated by the rocking of said shaft for controlling the operation of said seeding mechanism, a lever carried by said rock-shaft, a bar formed of two sections overlapping at their inner ends and each inner end having formed therein a slot and a hole, a bolt or key secured in each hole and extending into the slot in the other section, a connection between the sectional bar and the said lever, and means for moving said bar to turn said rock-shaft, substantially as and for the purpose specified.

4. In a corn-planter, the combination with a machine-frame having carrying-wheels, of seeding mechanism, a rock-shaft, means actuated by the rocking of said shaft for controlling the operation of said seeding mechanism, a lever carried by said rock-shaft, a bar formed of two sections overlapping at their inner ends and each inner end having formed therein a slot and a hole, a bolt or key secured in each hole and extending into the slot in the other section, a coiled spring located around the said overlapping inner ends of the sectional bar and bearing against said bolts or keys, a connection between the sectional bar and the lever, and means for moving said bar to turn said rock-shaft, substantially as and for the purpose specified.

5. In a corn-planter, the combination with a machine-frame having carrying-wheels, of seeding mechanism, a rock-shaft, means actuated by the rocking of said shaft for controlling the operation of said seeding mechanism, a lever carried by said rock-shaft, a bar adapted to be connected near one end with said lever, a lever pivotally mounted on the machine and having the inner end of said bar pivoted to it, the latter lever being adapted to be turned to carry the point of attachment of the bar thereto across a line drawn from the pivot of said lever to the point at which said rock-shaft lever is connected with said bar, substantially as and for the purpose specified.

6. In a corn-planter, the combination with a main frame having carrying-wheels, of a fertilizer-receptacle supported on said frame, a discharge-tube leading from said receptacle, a runner-frame attached to said main frame, a seedbox on said runner-frame, a discharge-tube leading therefrom, means for dropping fertilizing material and corn from said receptacle and box respectively into the tubes, a rock-shaft, means for actuating said rock-shaft, a lever pivoted to the tube leading from the said seedbox and adapted to be actuated through the movement of the rock-shaft, a pivot-bolt at the rear end of said lever, two rods attached to said pivot-bolt, the end of one of said rods being forked and the end of the other rod lying between said forked ends, and valves in the said tubes to which the said rods are respectively connected, substantially as and for the purpose specified.

7. In a corn-planter, the combination with a main frame having carrying-wheels, of a fertilizer-receptacle supported on said frame, a discharge-tube leading from said receptacle, a runner-frame attached to said main frame, a seedbox on said runner-frame, a discharge-tube leading therefrom, means for dropping fertilizing material and corn from said receptacle and box respectively into the tubes, a rock-shaft, means for actuating said rock-shaft, a pair of bell-crank levers pivoted on opposite sides of the tube leading from the seedbox and having their rear ends projecting beyond the seedbox and connected together by a pivot-bolt, means for connecting said bell-crank levers with said rock-shaft, and two rods attached to said pivot-bolt between the ends of said pair of bell-crank levers, one of said rods being located in rear of and substantially in line with the other, and each adapted to be connected with a discharge-valve in one of the said tubes, substantially as and for the purpose specified.

8. The combination of seeding mechanism, a fertilizer-receptacle having a suitable discharge-opening, and means for deflecting fertilizer discharged from said opening to the side of the seed deposited by said seeding mechanism, substantially as and for the purpose specified.

9. The combination of seeding mechanism, a fertilizer-receptacle having a suitable discharge-opening, and means arranged below and in the path of the fertilizer discharged from said opening for deflecting fertilizer to the side of the seed deposited by said seeding mechanism, substantially as and for the purpose specified.

10. The combination of a fertilizer-receptacle having a discharge-opening, of an inverted-V-shaped spreader arranged below said discharge-opening with its apex uppermost and its inclined side portions extending substantially in the line of travel of the machine, substantially as and for the purpose specified.

11. In a corn-planter, the combination of a seedbox, a discharge-tube leading therefrom, means for discharging corn from said box through said tube to the ground, a fertilizer-receptacle, a discharge-tube leading therefrom, said last-named tube being in the rear of the first-named tube, means for discharging material from the fertilizer-receptacle to the ground through the tube leading from said receptacle, and a device located beneath said last-named tube for spreading the material issued therefrom so that it will fall at the side of the corn issuing from the other tube, substantially as and for the purpose specified.

12. In a corn-planter, the combination of a seedbox, a discharge-tube leading therefrom, means for discharging corn from said box through said tube to the ground, a fertilizer-receptacle, a discharge-tube leading therefrom, said last-named tube being in the rear of the first-named tube, means for discharging material from the fertilizer-receptacle to the ground through the tube leading from said receptacle, and a spreader comprising two oppositely-inclined faces located beneath said last-named tube for deflecting the material issuing therefrom so that it will fall at both sides of the corn dropped from the front tube, substantially as and for the purpose specified.

13. In combination with a sectional discharge-tube of a corn-planter, a shield secured to one section of the tube and extending down sufficiently far to cover the joint between the two sections, substantially as and for the purpose specified.

14. The combination with a telescopic discharge-tube, of a shield attached at its upper end to one section and extending down sufficiently far to cover the joint between the section to which it is attached and the next lower section, said shield being flaring at its lower end to permit a limited telescopic movement of the sections, substantially as and for the purpose specified.

15. The combination with a receptacle, of a socket carried thereby adapted to receive a bolt-head and having an opening for the passage of the stem of the bolt, said socket and opening therein being of a size to permit the bolt to be swung laterally, a laterally-swinging bolt suspended from said socket, a seat for the receptacle, a fixed, laterally-extending lug provided with a notch adapted to receive the stem of the bolt, and a nut adapted to be screwed upon the bolt against said lug, substantially as described.

16. In a fertilizer-distributing machine, the combination with a machine-frame having carrying-wheels, of a fertilizer-receptacle carried by said frame, a shaft for operating the devices for discharging fertilizer from the receptacle, a sleeve loose on said shaft, a clutch fast on said shaft and adapted to engage with said sleeve, a beveled wheel secured to said clutch, a lever pivoted over said beveled wheel and adapted by being forced against the beveled face of the wheel to draw said clutch out of engagement with the sleeve, and means for driving the shaft through the sleeve when said sleeve and clutch are in engagement, substantially as and for the purpose specified.

17. In a fertilizer-distributing apparatus, the combination with a machine-frame having carrying-wheels, of a fertilizer-receptacle carried by said frame, a shaft for operating the devices for discharging fertilizer from the receptacle, a sleeve on said shaft, a spring-actuated clutch for connecting said sleeve to said shaft so as to turn therewith, a beveled wheel carried by said clutch, means adapted to engage said wheel for disengaging the clutch from said sleeve, a plurality of sprocket-wheels of different sizes on said sleeve, and a driving-chain driven from the axle of the carrying-wheels and adapted to be connected to any one of the sprocket-wheels on said sleeve, substantially as and for the purpose specified.

JOHN C. TUNNICLIFF.
JONATHAN H. SAMUELS.

Witnesses:
MORRIS GEISMAR,
A. L. MOORE.